(12) United States Patent
Hull et al.

(10) Patent No.: US 10,026,133 B2
(45) Date of Patent: Jul. 17, 2018

(54) METHOD AND SYSTEM OF ANALYZING WELLS OF A MATURE FIELD

(71) Applicant: LANDMARK GRAPHICS CORPORATION, Houston, TX (US)

(72) Inventors: Robert M. Hull, Houston, TX (US); Sung Hyun Kim, Houston, TX (US); Darrin S. Seulakhan, Cypress, TX (US); Michael L. Boothe, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 980 days.

(21) Appl. No.: 13/710,689

(22) Filed: Dec. 11, 2012

(65) Prior Publication Data
US 2014/0158346 A1 Jun. 12, 2014

(51) Int. Cl.
*E21B 47/00* (2012.01)
*G06Q 50/02* (2012.01)
(Continued)

(52) U.S. Cl.
CPC .............. *G06Q 50/02* (2013.01); *E21B 29/00* (2013.01); *E21B 41/0092* (2013.01);
(Continued)

(58) Field of Classification Search
CPC ........................................................ E21B 47/00
(Continued)

(56) References Cited

U.S. PATENT DOCUMENTS 6,012,016 A * 1/2000 Bilden .................... E21B 49/00
702/12
6,980,940 B1 * 12/2005 Gurpinar et al. ............... 703/10
(Continued)

FOREIGN PATENT DOCUMENTS

WO WO-2007084611 A2 7/2007
WO WO-2008089345 A1 7/2008
WO WO-2010138906 A1 12/2010

OTHER PUBLICATIONS

PCT Search Report and Written Opinion, PCT Application No. PCT/US2013/068389, dated Feb. 7, 2014.
(Continued)

*Primary Examiner* — Kenneth L Thompson

(57) ABSTRACT

Analyzing wells of mature field. At least some of the illustrative embodiments are methods including: gathering data about a group of wells; determining a condition of each well; creating an initial prioritization; creating a secondary prioritization based on at least one criteria provided by the client and the initial prioritization; analyzing at least some of the wells selected based on priority of each well in the secondary prioritization; interfacing with a service providing entity; providing to the client a first recommendation regarding corrective action, the first recommendation without regard to the service providing entity's availability to perform services; providing to the client a second recommendation regarding corrective action, the second recommendation taking into account the service providing entity's availability of crews and equipment; and performing at least one corrective action on at least one well, the performing based from the first or second recommendations.

24 Claims, 6 Drawing Sheets

(51) Int. Cl.
   *E21B 41/00* (2006.01)
   *G06Q 10/06* (2012.01)
   *E21B 29/00* (2006.01)
   *E21B 43/12* (2006.01)
   *E21B 43/26* (2006.01)

(52) U.S. Cl.
   CPC ............ *E21B 43/121* (2013.01); *E21B 43/26* (2013.01); *G06Q 10/0637* (2013.01); *G06Q 10/06315* (2013.01)

(58) Field of Classification Search
   USPC ................. 166/250.16, 250.01, 245, 313, 52
   See application file for complete search history.

(56) References Cited

U.S. PATENT DOCUMENTS

| | | | |
|---|---|---|---|
| 7,259,688 B2 | 8/2007 | Hirsch et al. | |
| 7,478,024 B2* | 1/2009 | Gurpinar et al. | 703/10 |
| 7,627,461 B2* | 12/2009 | Guyaguler et al. | 703/10 |
| 7,739,089 B2* | 6/2010 | Gurpinar et al. | 703/10 |
| 7,953,585 B2* | 5/2011 | Gurpinar et al. | 703/10 |
| 2005/0149307 A1* | 7/2005 | Gurpinar et al. | 703/10 |
| 2005/0267718 A1* | 12/2005 | Guyaguler et al. | 703/10 |
| 2007/0056727 A1* | 3/2007 | Newman | E21B 41/00 166/250.01 |
| 2007/0156377 A1* | 7/2007 | Gurpinar et al. | 703/10 |
| 2007/0175633 A1* | 8/2007 | Kosmala et al. | 166/250.15 |
| 2007/0271039 A1 | 11/2007 | Ella et al. | |
| 2008/0105424 A1* | 5/2008 | Remmert et al. | 166/250.01 |
| 2008/0228830 A1 | 9/2008 | Hawtin | |
| 2008/0288226 A1* | 11/2008 | Gurpinar et al. | 703/10 |
| 2009/0055029 A1 | 2/2009 | Roberson et al. | |
| 2009/0157590 A1 | 6/2009 | Mijares et al. | |
| 2009/0177404 A1 | 7/2009 | Hartmann et al. | |
| 2010/0211423 A1* | 8/2010 | Hehmeyer | 705/7 |
| 2012/0117104 A1 | 5/2012 | Stundner et al. | |
| 2012/0139747 A1 | 6/2012 | Papouras et al. | |
| 2017/0018037 A1* | 1/2017 | Hull | E21B 41/0092 |

OTHER PUBLICATIONS

Kartoatmodjo, G. et al. Risk-Based Candidate Selection Workflow Improve Acid Stimulation Success Ratio in Mature Field. SPE 109278. Society of Petroleum Engineers; 2007 SPE Asia Pacific Oil & Gas Conference and Exhibition, Jakarta, Indonesia; Oct. 30-Nov. 1, 2007.

The Federal Institute of Industrial Property of the Federal Service for Intellectual Property, Russia Patent Application No. 2015123496, Examination Search Report, dated May 23, 2016, 10 pages, Russia.

The Federal Institute of Industrial Property of the Federal Service for Intellectual Property, Russia Patent Application No. 2015123496, Examination Search Report, English Translation, dated May 23, 2016, 8 pages, Russia.

Canadian Intellectual Property Office, Canadian Patent Application No. 2,889,663, Examiner's Requisition, dated Aug. 12, 2016, 4 pages, Canada.

* cited by examiner

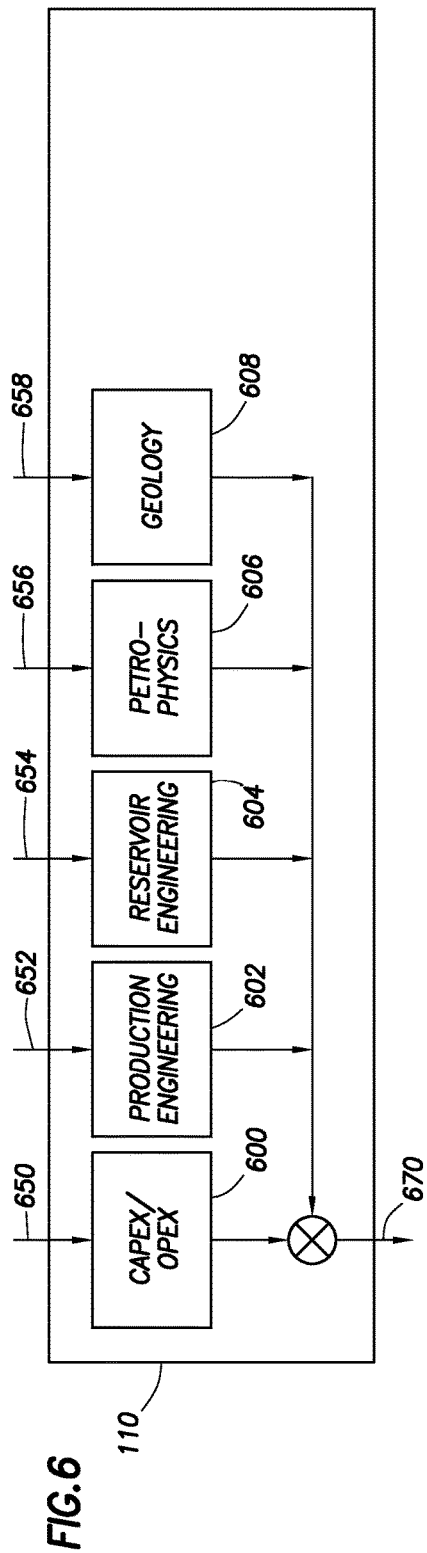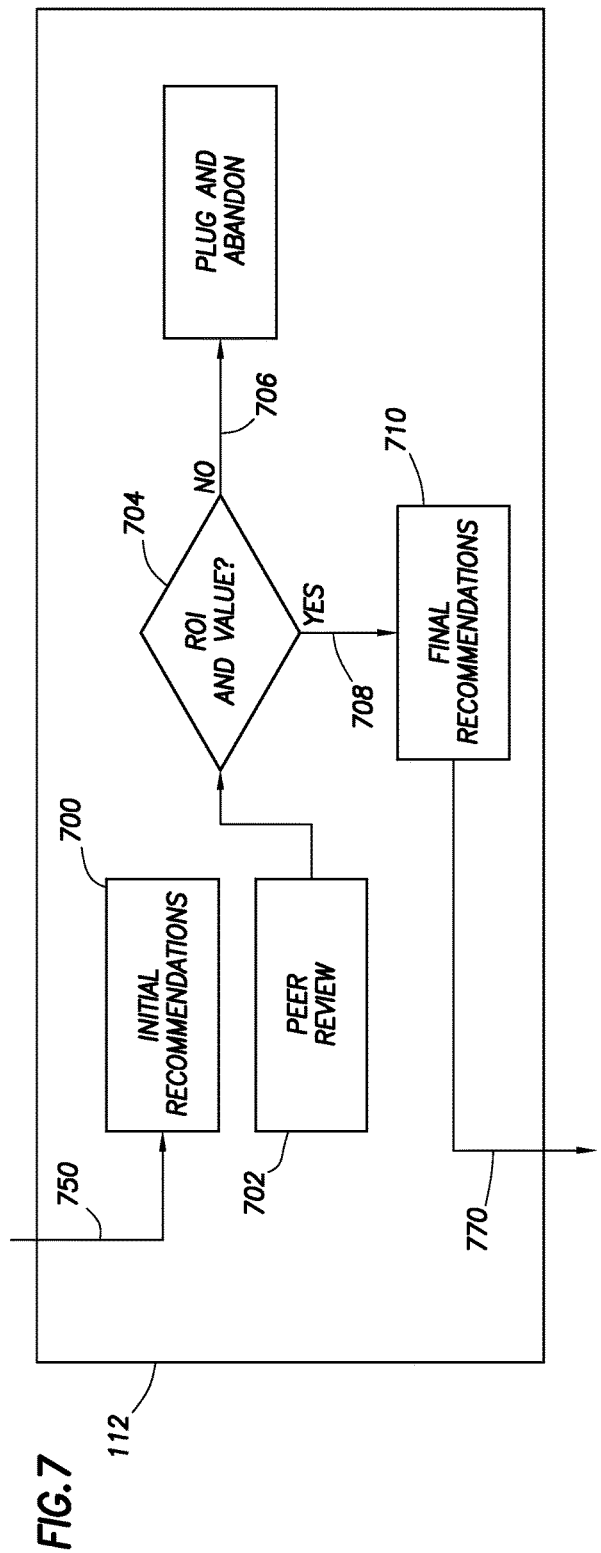

METHOD AND SYSTEM OF ANALYZING WELLS OF A MATURE FIELD

BACKGROUND

The hydrocarbon exploration and production industry is very efficient at identification and extraction of hydrocarbons from new hydrocarbon reserves. However, current estimates are that 65% of the world's hydrocarbon reserves reside in previously developed fields (i.e., mature assets). That is, over half the world's hydrocarbon reserves may reside in fields were the initial exploration and drilling took decade ago or more.

As whole, the hydrocarbon industry is less efficient at increasing hydrocarbon production from mature assets. There may be many factors contributing to the lower efficiency in increasing hydrocarbon production from mature assets, such as a lack of information regarding the wells (e.g., wells drilled before the widespread use of computers, wells drilled before development of modern formation evaluation tools) and/or the somewhat overwhelming task of analysis (e.g., older fields having on the order of 15,000 wells).

BRIEF DESCRIPTION OF THE DRAWINGS

For a detailed description of exemplary embodiments, reference will now be made to the accompanying drawings in which:

FIG. 6 shows, in block diagram form, a flow diagram of detailed studies of the example method;

FIG. 7 shows, in block diagram form, a flow diagram of the second collaborative process of the example method;

NOTATION AND NOMENCLATURE

Figure 9:
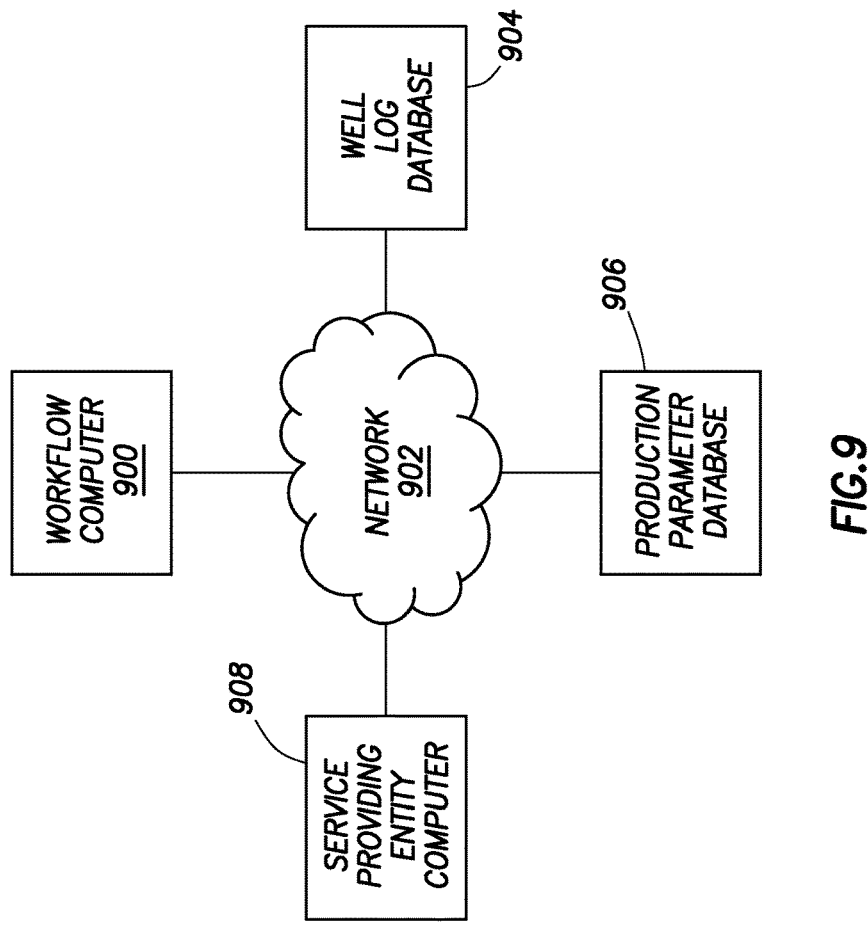
FIG. 9 shows, in block diagram form, a system of computers that may be used to implement the programmatic aspects of the various embodiments.

Certain terms are used throughout the following description and claims to refer to particular system components. As one skilled in the art will appreciate, different companies may refer to a component and/or a process by different names. This document does not intend to distinguish between components and/or processes that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Bypassed zones" shall mean zones within a well penetrating a hydrocarbon bearing formation from which hydrocarbons may be produced, but where a casing of the well has, at the depth of the hydrocarbon bearing formation, not been perforated.

"Well" shall mean a wellbore that is at least partially cased, and from which hydrocarbons have been previously produced or are currently being produced.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to a new and novel workflow used to analyze mature hydrocarbon production assets (i.e., mature assets or mature fields) and to provide recommendations to the owner and/or operator of the mature fields (hereafter just "client") regarding what actions should be taken to increase hydrocarbon production and/or to meet regulatory guidelines. More particularly, the example workflow involves an iterative process of prioritizing a group of wells within a field of wells, the prioritization initially based on corrective action that may be implemented to increase hydrocarbon production (or to meet regulatory requirements), then later the prioritization is modified based on criteria provided by the client. Based on the prioritization, a detailed analysis of the wells is made. In one example method, two recommendations are thereafter made to the client: 1) a recommendation regarding corrective action for at least some of the wells, the recommendation without regard to a service provider's availability to perform the recommended corrective actions; and 2) a recommendation regarding corrective action taking into account a service provider's availability of crews and equipment to perform the recommended corrective actions. The specification first provides a high level overview of the workflow, followed by a detailed analysis of each step.

Figure 1:
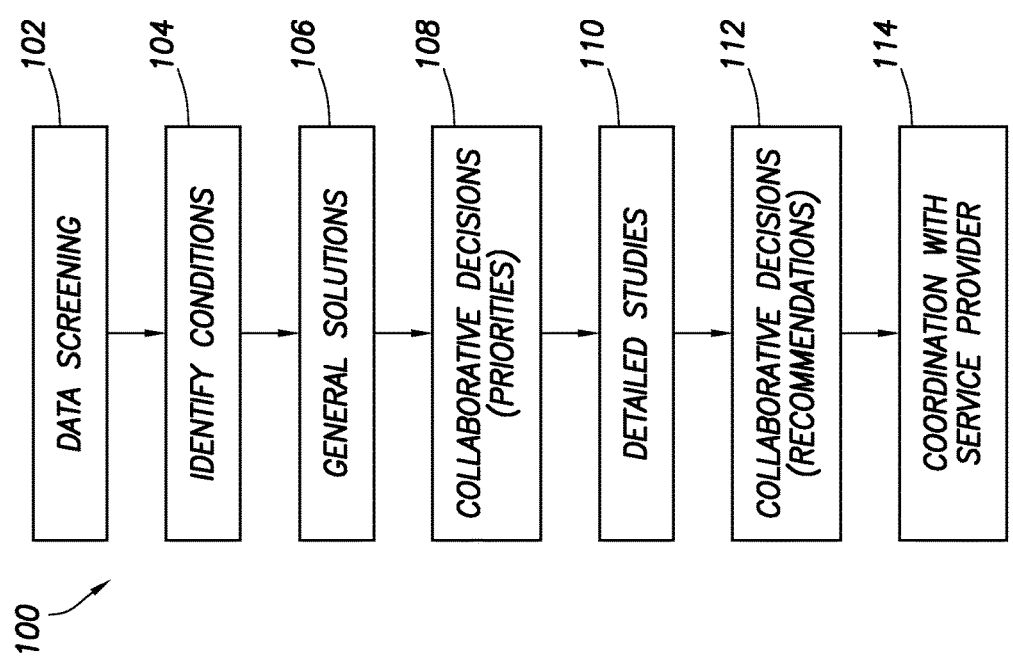
FIG. 1 shows, in block diagram form, a high level overview of an example method.

FIG. 1 shows, in block diagram form, a high level flow diagram of a workflow 100 in accordance with example methods and systems. The example workflow 100 begins with data screening 102. The data screening 102 may be considered a data gathering step regarding wells logically grouped within a field. From the data screening 102 the next example step in the workflow 100 is a step to identify conditions 104 of some or all wells in the field. From the conditions identified, the next example step is a general solutions 106 step in which an initial prioritization of the wells is made, the initial prioritization based on possible corrective actions for each well. From the initial prioritization, the example workflow transitions to a step titled collaborative decisions 108, within which step a secondary prioritization of the wells is made based on the initial prioritization and criteria provided by the client. Detailed studies 110 are then made on some or all the wells, with the wells for detailed studies selected at least in part from the secondary prioritization. Once the detailed studies are complete, the example method moves to a second collaborative decisions 112 step, where the results of the detailed studies are analyzed against various economic considerations of the client. Finally, the example workflow may involve coordination 114 step that involves coordination with a service providing entity (e.g., a company with crews and equipment to perform corrective actions).

In some example cases the client is then provided two recommendations: 1) a first recommendation regarding corrective action for at least some of the wells, where the first recommendation is without regard to a service providing entity's ability to provide the services of the recommended corrective actions; and 2) a second recommendation regarding corrective action for at least some of the wells, where the second recommendation is based on a service providing entity's ability to provide the services of the recommended corrective actions. In some cases, the recommendations may also have a time component. For example, one or both the recommendations may indicate a time frame for taking corrective actions regarding at least some of the wells, such as corrective actions to be performed in 1-3 months, 4-6 months, and 6 months and beyond. The specification now turns to a more detailed description of each example step in the workflow.

Figure 2:
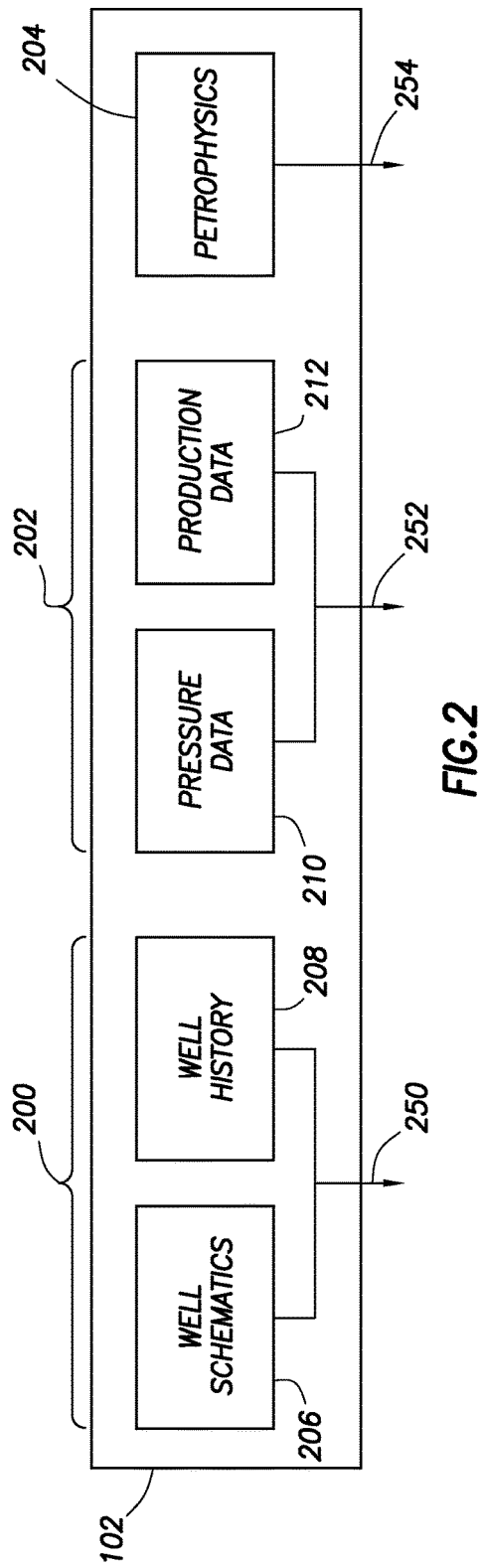
FIG. 2 shows, in block diagram form, a flow diagram of data screening of the example method.

FIG. 2 shows, in block diagram form, example parameters to be considered as part of the data screening 102. In particular, the data screening 102 step may be considered, to some extent, a data collection step. The data collected may be logically divided into mechanical aspects 200, production aspects 202, and petrophysics aspects 204. Each will be addressed in turn. Data collected regarding mechanical aspects may include information such as well schematics 206 and well history 208. Well schematics 206 may include information regarding the physical construction of the well. For example, well schematics may reveal information, such as total depth, hole diameter(s), casing information (e.g., type, thickness), cement information, depth and location of production zones, screen types, completion types, production tubing information, and directional survey information. The example well history 208 may include information related to physical aspects of the well, such as mechanical issues that occurred in the past (e.g., well collapse, packer failures) and prior remedial actions taken with the respect to mechanical aspects of the well. The information regarding mechanical aspects 200 may provide indications of corrective actions that can be taken to increase hydrocarbon production. Example corrective actions regarding mechanical aspects are discussed with the respect to the general solutions 106 step below.

The data collection category of production aspects 202 may be directed to information and parameters associated with production of hydrocarbons from the wells. For example, pressure data 210 may refer to measured downhole pressure of the hydrocarbons, and/or measured surface pressure of the hydrocarbons, both present day and in the past. The downhole and/or surface pressure information may provide indications of corrective actions that can be taken to increase hydrocarbon production. The data collection category of production aspects 202 may further comprise production data 212. Production data 212 may include past and/or current data regarding hydrocarbon production, but also related information such as oil production, gas production, water cut, water type (e.g., fresh water or salt water), carbon dioxide production, and secondary recovery fluid production (which may be carbon dioxide). Example corrective actions regarding production aspects are discussed with the respect to the general solutions 106 step below.

Still referring to FIG. 2, the data screening 102 step may further comprise a petrophysics 204 aspect. That is, at various times in the creation and production from a well, various "tools" may be run with the well to create "well logs" of measure formation properties, where the formation properties may be indicative of the ability of the formation to economically produce hydrocarbons. For example, well logs may include natural gamma logs (i.e., created by a tool that measures natural gamma radioactivity), gamma-gamma logs (i.e., created by a tool that releases interrogating energy in the form of gamma rays or particles), neutron-gamma logs (i.e., created by a tool that releases interrogating energy in the form of neutrons), and electrical resistivity logs. The example petrophysics 204 aspect may thus involve gathering any such previously created logs. Moreover, depending on the age of the wells and the vintage of the logs previously run, in some cases modern logs may be run as part of the petrophysics 204 aspect.

In many cases, the example workflow is applied to wells in a field of wells where the some or all wells are many decades old. Thus, the data gathering and screening represented by the data screening 102 step may involve a process of physically gathering various paper charts, logs, and graphs. In yet still other cases, the wells in the field of wells may be relatively new, such that some or all data gathering and screening represented by the data screening 102 step may be with respect to electronically accessible files. Thus, the data screening 102 step may involve programmatically searching various electronic databases for information about the wells. In yet still other cases, some of the information about wells in field of wells may involve physically gathering some information, and other information about the wells in the field of wells may involve a programmatic gathering process. The specification now turns to the example identify conditions 104 step.

Figure 3:
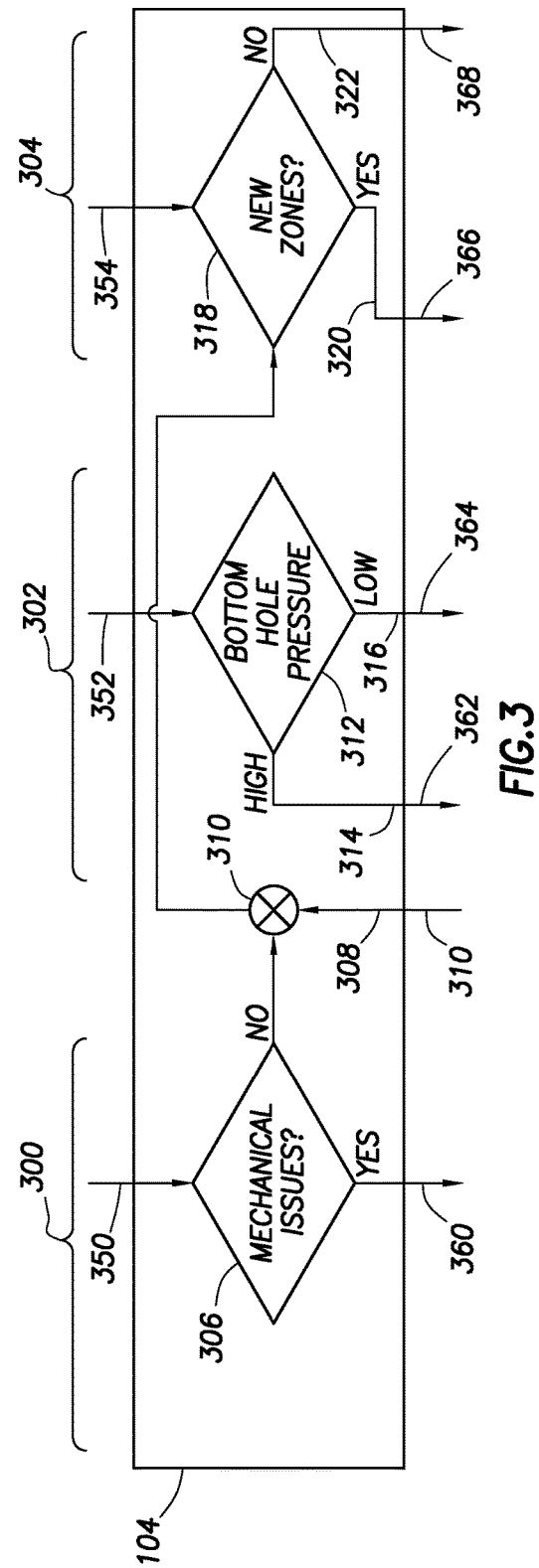
FIG. 3 shows, in block diagram form, a flow diagram of identifying conditions of the example method.

FIG. 3 shows, in block diagram form, aspects of the identify conditions 104 step. In particular, after the data screening 102, the example method proceeds to the identify conditions 104 step. At the high level, the identify conditions 104 step may involve identifying conditions within or associated with each well which may be adversely affecting hydrocarbon production. It is noted that the example method implemented at the identify conditions 104 step may be considered a high level analysis. Only broad categories of identification are implemented, as detailed analysis is implemented at other logical locations within the overall workflow 100. The goal of the identify conditions 104 step is to aid in the creation of an initial prioritization of the wells in the general solutions 106 step (discussed more below).

There are three example categories of analysis within the identify conditions 104 step, and the three example categories are related to the broad categories from the data screening 102 step. In particular, the three example categories are mechanical aspects 300, production aspects 302, and petrophysics aspects 304. The example conditions identified in the mechanical aspects 300 category may be based on data gathered in the data screening 102 step, particularly the mechanical aspects 200 category. That is, arrow 250 of FIG. 2 may logically tie to arrow 350 of FIG. 3. The example conditions identified in the production aspects 302 category may be based on data gathered in the data screening 102 step, particularly the production aspects 202 category. That is, arrow 252 of FIG. 2 may logically tie to arrow 352 of FIG. 3. The example conditions identified in the petrophysics aspects 304 category may be based on data gathered in the data screening 102 step, particularly the petrophysics aspects 204 category. That is, arrow 254 of FIG. 2 may logically tie to arrow 354 of FIG. 3.

With respect to mechanical aspects 300, for each well mechanical conditions are identified from the gathered data which may be indicative of mechanical issues affecting hydrocarbon production. If a mechanical issue exists for well (decision block 306, "YES" path), the information is passed to the general solutions 106 step. On the other hand, if no mechanical issues exist for a well, the well may be subject to analysis regarding bypassed zones (decision block 306, "NO" path). Relatedly, regardless of the corrective actions determined at the general solutions 106 step (that is, even if a corrective action is identified that may increase hydrocarbon production), a well may nevertheless be analyzed for bypassed zones as indicated by arrow 308 and summation block 310.

Still referring to FIG. 3, with respect to production aspects 302, for each well an analysis is made of bottomhole pressure (decision block 312). Either a well is categorized as having "high" bottom hole pressure (line 314), or a well is categorized as having "low" bottom hole pressure (line 316). As will be discussed in greater detail below, bottomhole pressure may be indicative of possible correction action in the form of installing artificial lift.

With respect to the petrophysics aspects 304 some or all the wells may be analyzed for the presence of new zones (i.e., bypassed zones) from which hydrocarbons may be produced (decision block 318). The analysis may be based on prior well logs gathered during the data screening 102 step, may be based on recently taken well logs performed as part of the data screening 102 step, or both. Each well analyzed may thus be categorized as a candidate for new zones of development (as illustrated by the "YES" line 320), or categorized as not a candidate for development of further zones (as illustrated by the "NO" line 322). Before proceeding it is noted that the analysis regarding new zones for development need not be implemented in every application of the workflow. It is possible that a client may either be fully aware of new zones, or is not interested in a new zone analysis, and thus in some example situations the new zone analysis may be omitted.

In some example situations, the analysis represented by the identify conditions 104 step may be carried out manually. For example, if the wells of the field are many decades old, the data may be "paper" data, and thus the analysis lends itself most easily to a manual review process by experienced engineers and physicists. On the other hand, if some or all the data analyzed is available in electronic form, then some or all the analysis may be performed programmatically on a computer system of a set of computer systems programmed to perform the analysis. The specification now turns to the general solutions 106 step.

Figure 4:
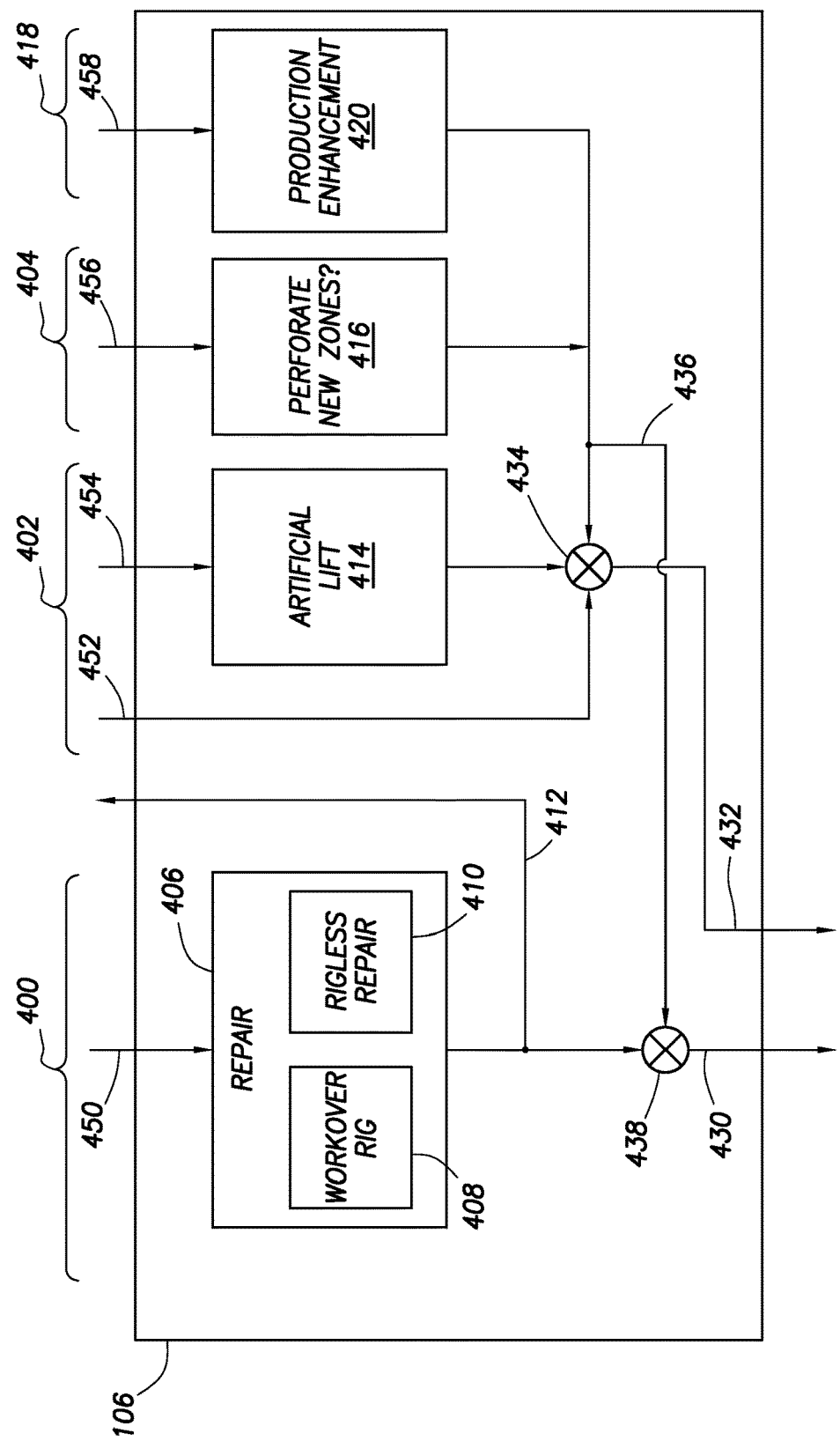
FIG. 4 shows, in block diagram form, a flow diagram of general solutions of the example method.

FIG. 4 shows, in block diagram form, aspects of the general solutions 106 step. In particular, after the identify conditions 102 step the example method proceeds to the general solutions 106 step. At the high level, the general solutions 106 step may involve identifying corrective actions that may be taken with respect to each well, and from which an initial prioritization of the wells based on the corrective actions may be made. Here again, the analysis at the general solutions 106 step is not a detailed analysis to arrive at precise corrective action(s) (if any) for each well; rather, the general solutions 106 step is meant to categorize the expected type of corrective actions to inform the creation of the initial prioritization of the wells in the field.

There are four example categories of analysis within the general solutions 106 step, and three of the example categories relate directly to the broad categories from the data screening 102 step and identify conditions 104 step. In particular, the three example categories that relate directly are mechanical aspects 400, production aspects 402, and petrophysics aspects 404. The example corrective actions identified in the mechanical aspects 400 category may be based on conditions identified in the identify conditions 104 step, particularly the mechanical aspects 300 category. That is, arrow 360 of FIG. 3 may logically tie to arrow 450 of FIG. 4. The example corrective actions identified in the production aspects 402 category may be based on conditions identified in the identify conditions 104 step, particularly the production aspects 302 category. That is, arrows 362 and 364 of FIG. 3 may logically tie to arrows 452 and 454, respectively, of FIG. 4. The example corrective actions identified in the petrophysics aspects 404 category may be based on conditions identified in the identify conditions 104 step, particularly the petrophysics aspects 304 category. That is, arrow 366 of FIG. 3 may logically tie to arrow 456 of FIG. 4.

With respect to mechanical aspects 400, for each well corrective actions are identified, where the corrective actions are based on the mechanical conditions identified in the identify conditions 104 step. Again at this stage, the precise corrective action(s) for each well need not be identified; rather, the corrective action may be categorized as a repair 406 that may utilize a workover rig (as indicated in the workover rig 408 box), or a repair 406 that may be implemented without a workover rig (as indicated by the "rigless repair" 410 box). As mentioned with respect to the identify conditions 104 step, even if a corrective action is identified, a well may nevertheless be analyzed for bypassed zones, and thus the logical flow represented in the mechanical aspects 400 section also includes a path (line 412) that feeds back to the identify conditions 104 step (i.e., line 412 may logically tie to line 370 of FIG. 3).

Still referring to FIG. 4, with respect to production aspects 402, for each well an analysis is made as to the possibility of corrective action in the form of artificial lift (as indicated by the artificial lift 414 box). That is, if the bottomhole pressure (decision block 312 of the identify conditions 104 step) is categorized as having "low" bottomhole pressure, then a corrective action in the form of artificial lift may be indicated. On the other hand, if the bottomhole pressure (decision block 312 of the identify conditions 104 step) is categorized as having "high" bottomhole pressure, then a corrective action in the form of artificial lift may not be indicated (notice how line 452 bypasses the artificial lift 414 box). Artificial lift may take many forms (e.g., pump jack, submersible pump, and gas lift system); however, the precise type of lift need not necessarily be determined at the general solutions 106 step. Rather, the identification of a corrective action in the form of artificial lift (without regard to the precise type) may be used as a portion of the initial prioritization created in the early stages of the example workflow 100.

With respect to the petrophysics aspects 404, some or all the wells may be more closely analyzed for the presence of new zones (i.e., bypassed zones) from which hydrocarbons may be produced (as indicated in the perforate new zones 416 box). The more detailed analysis may be based on prior well logs gathered during the data screening 102 step, may be based on recently taken well logs performed as part of the data screening 102 step, or both. Here again, while the analysis represented in the perforate new zones 416 box is more detailed than that represented by the decision box 318 of the identify conditions 104 step, the analysis at this stage is merely from a petrophysics standpoint to make an initial determination of viability of bypassed zones. As will be discussed in greater detail later in the specification, other economic considerations may militate against actually perforating a new zone in spite of the fact that, from a petrophysics standpoint, a bypassed zone has been identified.

Still referring to FIG. 4, a new logical aspect is introduced with respect to FIG. 4—an enhancement aspect 418. That is, a well may or may not have mechanical issues (decision block 306 of FIG. 3), but if a well is determined to not have any bypassed zones (decision block 319 of FIG. 3, "no" line 322), the well may be a candidate for enhancement through actions such as acidizing or re-fracturing. Thus, arrow 368 of FIG. 3 may logically tie to arrow 458 of FIG. 4. In the general solutions 106 step a corrective action in the form of further production enhancement may be identified (as indicated in the production enhancement 420 box). Here again, the precise corrective action to implement the production enhancement need not be identified; rather, the identification of a corrective action in the form of production enhancement (without regard to the precise type) may be used to create the initial prioritization of the wells. In some cases, wells that have mechanical issues, and/or wells for which bypass zones may be available, are nevertheless also analyzed regarding the enhancement aspect 418; however, the logical connections to implement the multiple aspect analysis for such wells are not shown so as not to unduly complicate the figures.

Logically, all the corrective actions determined feed to the next step, the collaborative decisions 108 step, as indicated by lines 430 and 432. In some cases, the mechanical aspects 400 may be considered to stand alone in the initial prioritization (line 430), and the production aspects 402, petrophysics aspects 404, and enhancement aspects 418 are logically combined (summation block 434, leading to line 432). As noted previously, some wells with corrective actions indicated based on mechanical aspects 400 may also be analyzed for bypassed zones (line 412), and thus logically these wells are also considered in the mechanical aspects in the later analysis (as indicated by line 436 and summation block 438).

In some example situations, the analysis represented by the general solutions 106 step may be carried out manually. For example, if the wells of the field are many decades old, the data may be "paper" data, and thus the analysis lends itself most easily to a manual review process by experienced engineers and physicists. On the other hand, if some or all the data analyzed is available in electronic form, then some or all analysis may be performed programmatically on a computer system of set of a computer systems programmed to perform the analysis.

Figure 5:
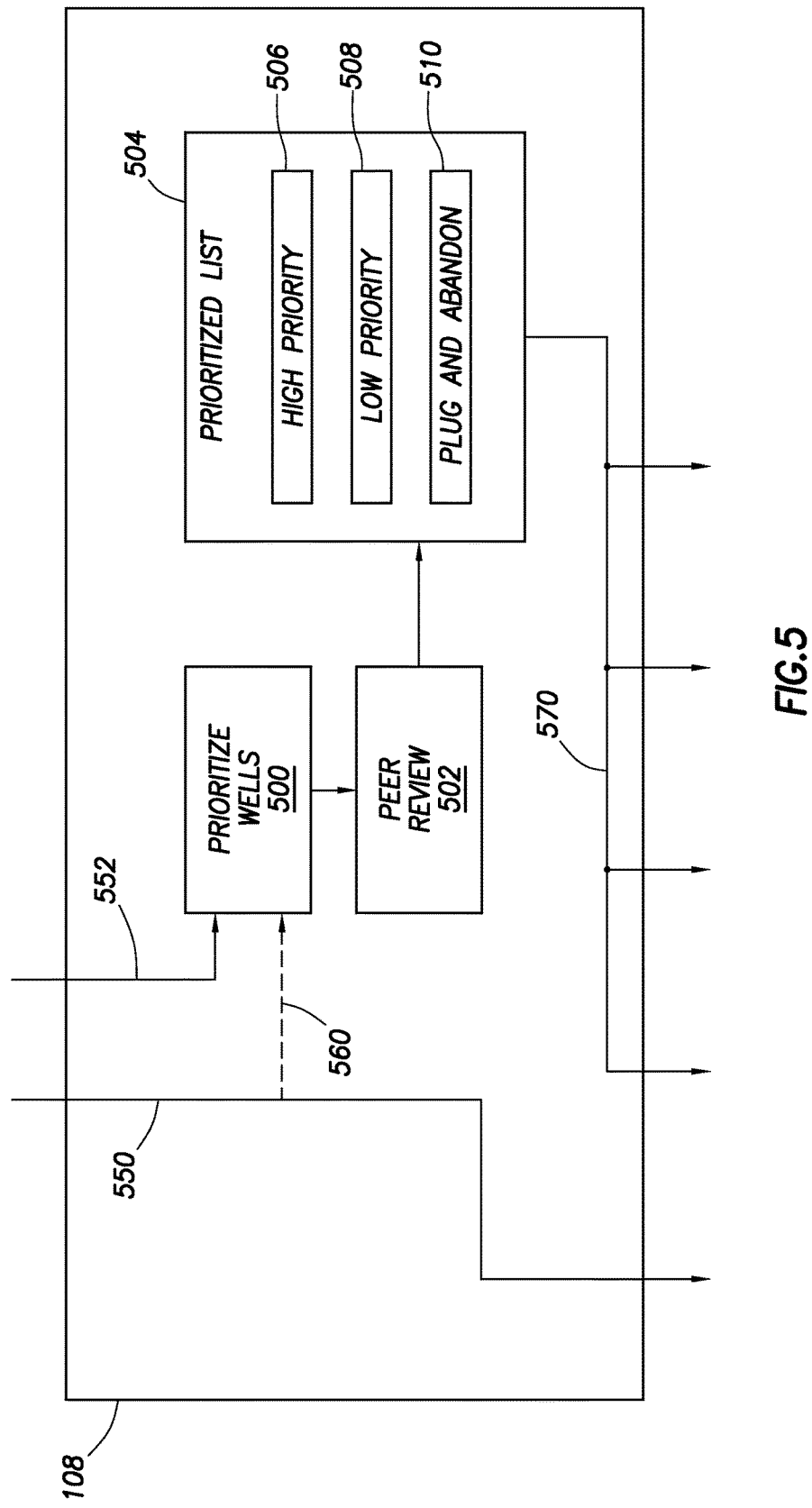
FIG. 5 shows, in block diagram form, a flow diagram of a first collaborative process of the example method.

FIG. 5 shows, in block diagram form, aspects of the collaborative decisions 108 step. In particular, after the general solutions 106 step the example method 100 proceeds to the collaborative decisions 108 step. Logically, the collaborative decisions 108 step takes as input indications of the corrective actions determined at the general solutions 106 step. That is, the collaborative decisions 108 step is logically tied to the indications of corrective action associated with mechanical aspects 400 (line 430 of FIG. 4 is logically tied to line 550 of FIG. 5), and the collaborative decisions 108 step is logically tied to the indications of corrective action associated with the production aspects 402, petrophysics aspects 404, and enhancement aspects 418 (line 432 of FIG. 4 is logically tied to line 552 of FIG. 5). What is created by the collaborative decisions 108 step is an initial prioritization of the wells in the field (creation of the initial prioritization illustrated by the prioritize wells 500 block). That is, wells are categorized at a high level based on broad categories of corrective actions. However, the initial prioritization has not necessarily taken into account other criteria, such as the goals of the client and/or the financial considerations of the client.

In some cases, and as illustrated, wells having mechanical issues are a prioritization category in their own right, as illustrated by line 550 passing through the collaborative decisions 108 step. That is, in the example workflow 100 the wells with mechanical issues are analyzed in more detail at the detailed studies 110 step, and are not subject to further prioritization; however, in other cases the wells with mechanical issues may be subject to further prioritization, as illustrated by dashed line 560.

The example collaborative decisions 108 step, and in particular the initial prioritization represented by the prioritize wells block 500, next moves to a peer review process (as illustrated by the peer review 502 block). The peer review may take many forms, but in some cases the initial prioritization involves a collaborative analysis of the wells in the initial prioritization with the client, and in some cases third-party engineers. From the collaborative peer review, a secondary prioritization of the wells is made (as illustrated by the prioritized list 504) taking into account a criterion or criteria provided by the client. For example, if the initial prioritization reveals a majority of the analyzed wells have sanding issues, while a small number of wells have performance issues (e.g., high water cut, water migrating up the casing), the client may decide to focus efforts on the sanding issues given budget constraints as solutions regarding sanding may be widely applicable. Moreover, at this stage the collaborative peer review may indicate that certain wells should be plugged and abandoned, without further detailed analysis.

In some example workflows, the secondary prioritization may result in three categories of wells, such as: high priority wells 506; low priority wells 508; and wells to be plugged and abandoned 510. In yet still other example workflows, the secondary prioritization may result two categories of wells, such as: high priority wells 506; and wells to be plugged and abandoned 510. The number of categories within the secondary prioritization may be driven, in part, by client desires and limitations.

In some example situations, portions of the analysis represented by the collaborative decisions 108 step may be carried out manually. For example, the peer review 502 aspects may be based on a face-to-face meeting with the client and/or third-party engineer. However, other portions of the example collaborative decisions 108 step may be performed programmatically on a computer system of a set of computer systems programmed to perform the analysis. For example, the initial prioritization based on corrective actions (to arrive at the prioritized wells 500) may be performed programmatically based solely on the corrective actions and without human involvement. Moreover, once a criterion or criteria are provided by the client, the secondary prioritization (to arrive at the prioritized list 504) may be performed programmatically based solely on the prioritized wells 500 and an indication of the criteria provided to the computer system.

FIG. 6 shows, in block diagram form, aspects of the detailed studies 110 step. In particular, after the collaborative solutions 108 step the example method proceeds to the detailed studies 110 step. Logically, the detailed studies 110 step takes as input the secondary prioritization (shown as prioritized list 504), as well as data gathered during the data screening 102 step (the logical connection to the data screening 102 step not shown so as not to unduly complicate the figures). In some example workflows 100, the detailed studies 110 step may be logically broken into five example components: capital investment analysis and/or operating investment analysis (Capex/Opex) 600; production engineering analysis 602; reservoir engineering analysis 604; petrophysics analysis 606; and geology analysis 608. In the illustrative workflow, the Capex/Opex analysis 600 is logically tied to the corrective actions indicated for the mechanical aspects 400 in FIG. 4 (as shown by line 550 of FIG. 5 tied to line 650 of FIG. 6). Each of the analysis blocks 602, 604, 606, and 608 are logically tied to the prioritized list 504 as shown by line 570 and lines 652, 654, 656, and 658, respectively, of FIG. 6.

A few points before proceeding. Firstly, while the figures show the Capex/Opex analysis 600 tied directly to the corrective actions indicated for the mechanical aspects 400 in FIG. 4 (by line 550 passing through the collaborative decision 108 step), as mentioned above in other cases the mechanical issues may likewise be a basis for prioritization, and thus in some cases the Capex/Opex analysis may likewise be logically tied to the prioritized list 504. Moreover, the example analysis blocks of FIG. 6 are not all necessarily needed and/or used in every situation. Thus, some or all of the analysis represented by the analysis blocks may be omitted in any particular workflow based on various parameters, such as client criteria or lack of corrective actions that implicate a particular analysis block. Each of the example analysis blocks will be discussed briefly to orient the reader; however, the specification contemplates that one having ordinary skill is well aware of each type analysis, and thus so as not to unduly complicate the discussion only high level overviews are presented.

The "Capex" portion of the Capex/Opex analysis 600 represents a financial analysis regarding return-on-investment for capital expenditures to perform the indicated corrective actions. That is, an analysis may be performed that analyzes the present day expenditures of the indicated corrective action in view of future increased hydrocarbon production to determine whether the capital outlay will be recovered, or the return on the capital outlay will result in a future income stream sufficient to justify the capital expenditure. What classifies as a capital expenditure is based on tax rules, and subject to change, but may include some aspects of correcting mechanical issues, installation of new downhole equipment to implement artificial lift, new surface equipment (e.g., pump jacks, separators, storage tanks), or perforating the casing to expose bypassed zones for production.

Still referring to FIG. 6, the "Opex" portion of the Capex/Opex analysis 600 represents a financial analysis regarding the relationship between day-to-day increased (or decreased) operations costs associated with indicated corrective actions. That is, an analysis may be performed that analyzes the non-capital expenditures in view of future increased hydrocarbon production and thus increased gross income to determine whether the operational cost associated with a corrective action is justified, or whether the operational costs cuts too deeply into the gross income stream. What classifies as an operational cost as opposed to a capital expenditure is based on tax rules, and subject to change, but may include some aspects of correcting mechanical issues, re-fracturing, and/or acidizing jobs.

The remaining analysis blocks are addressed in turn. However, it is noted that the analysis represented by these block are not necessarily mutually exclusive. That is, any particular indicated corrective action may involve an analysis from one or more of these example analysis blocks. For example, bypassed zones for which additional perforations are contemplated may involve not only a production engineering analysis 602, but also analysis within the reservoir engineering analysis 604 and geology analysis 608.

The production engineering analysis 602 may relate to hydrocarbon production aspects, such as amount or volume of oil produced, gas produced, pressures of oil and gas produced, and the water content or water cut associated with the production. The production engineering analysis 602 may be utilized when evaluating artificial lift scenarios, analyzing re-fracturing one or more zones, addressing sanding issues, and/or analyzing production bottlenecks caused by surface equipment.

The reservoir engineering analysis 604 blocks represents an analysis of field or reservoir-scale hydrocarbon drainage issues. Thus, the reservoir engineering analysis 604 may be utilized when studying possible corrective actions, such as perforating new zones to reach bypass zones, or decisions on plugging and abandonment.

The petrophysics analysis 606 block represents an analysis as to the micro-scale aspects of rock properties, such as pores, pore spaces, permeability, and micro-scale migration of hydrocarbons. The petrophysics analysis 606 may be used when studying possible corrective actions such as acidizing considerations, re-fracturing considerations, and issues surrounding perforating the casing to expose bypass zones.

The geology analysis 608 block represents an analysis of macro-scale considerations surrounding the hydrocarbon bearing formation(s), such as creation mechanisms, burial history, geological exposed temperatures, quality of oil and gas generated, and the like. The geology analysis 609 may be used when studying possible corrective actions, such an analysis hydrocarbon quality in identified bypassed zones. The results of the detailed studies represented in the detailed studies 110 block are passed to the second collaborative decisions 112 step.

FIG. 7 shows, in block diagram form, aspects of the collaborative decisions 112 step. In particular, after the detailed studies 110 step the example method 100 proceeds to the collaborative decisions 112 step. Logically, the collaborative decisions 112 step takes as input the results of the detailed studies performed with respect to the wells during the detailed studies 110 step. That is, the collaborative decisions 112 step is logically tied to the results of the detailed studies (line 670 of FIG. 6 is logically tied to line 750 of FIG. 7). What is created by the collaborative decisions 112 step is an initial set of recommendations regarding wells in the field (creation of the initial set of recommendations illustrated by the initial recommendations 700 block). That is, initial recommendations 700 may be recommendations on corrective actions to be performed with respect to the wells, possibly in including a particular order, based on any suitable initial parameters (e.g., best expected results, lowest cost, quickest results). However, the initial recommendations 700 do not necessarily fully take into account other criteria, such as the goals of the client and/or the financial considerations of the client.

The example collaborative decisions 112 step, and in particular the initial set of recommendations represented by the recommendations block 500, next moves to a peer review process (as illustrated by the peer review 702 block). The peer review may take many forms, but in some cases the peer review involves a collaborative analysis of the initial set of recommendations with the client, and in some cases third-party engineers and/or scientists. From the collaborative peer review, the wells in the field may be logically divided (decision block 704) into wells that should be plugged and abandoned (the "NO" line 706) and wells for which final corrective actions recommendations may be made (the "YES" line 708, leading to the final recommendations 710 block). The decision represented by decision block 704 may be based on a criterion or criteria provided by the client. For example, the client may have a predetermined return-on-investment, and wells for which proposed corrective actions result in a return-on-investment below the predetermined return-on-investment may thus be designated as plug and abandon. Return-on-investment is merely an example, and any value determination may be implemented within the decision block 704.

In some example situations, portions of the analysis represented by the collaborative decisions 112 step may be carried out manually. For example, the peer review 702 aspects may be based on a face-to-face meeting with the client and/or third-party engineers. However, other portions of the example collaborative decisions 112 step may be performed programmatically on a computer system of set of computer systems programmed to perform the analysis. For example, the initial prioritization based on detailed studies (to arrive at the initial recommendations 700) may be performed programmatically and without human involvement. Moreover, once a criterion or criteria are provided by the client, the secondary prioritization (to arrive at the final recommendations 710) may be performed programmatically.

Regardless of whether the recommendations and decisions are made manually, programmatically, or both, the client may be provided the final recommendations 710. The final recommendations 710 thus represent corrective actions for at least some of the wells, but in some example workflows 100 the final recommendations 710 are without regard to a service providing entity's availability of crews and equipment to perform the corrective actions. The inventors of the present have found that clients in many cases have their own crews and/or equipment to perform at least some of the proposed corrective actions, and thus the final recommendations 710 may be implemented, in whole or part, by the client directly. However, in situations where the client does not have crews and/or equipment to perform the corrective action, or where the client does not have sufficient crews and/or equipment to perform the corrective actions, in some cases a further set of recommendations are provided to the client.

Figure 8:
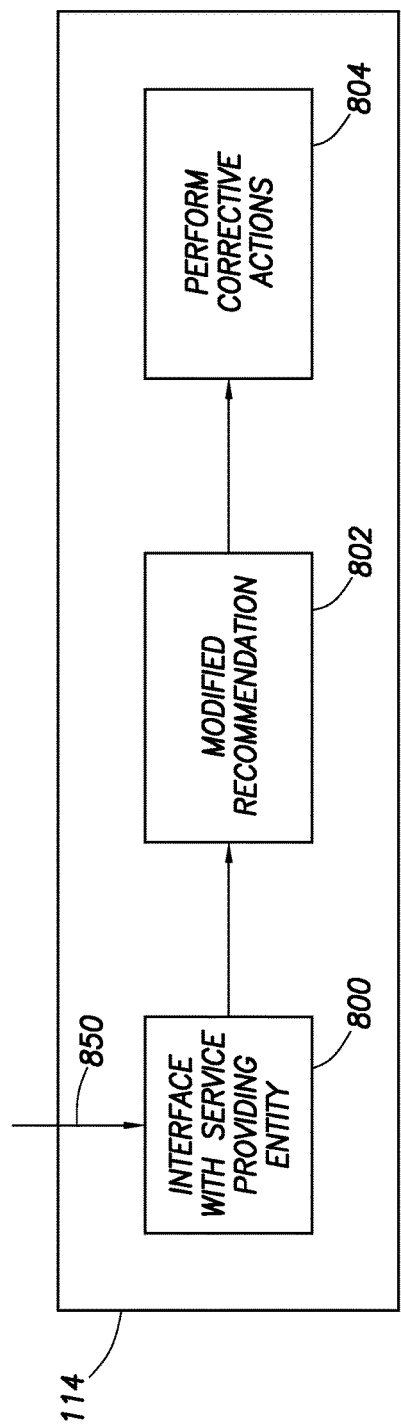
FIG. 8 shows, in block diagram form, a flow diagram of interfacing with a service providing entity of the example method.

FIG. 8 shows, in block diagram form, aspects of the coordination with the service provider 114 step (hereafter just "coordination 114 step"). In particular, after the collaborative decisions 112 step the example method 100 proceeds to the coordination 114 step. Logically, the coordination 114 step takes as input final recommendations 710. That is, the coordination 114 step is logically tied to the results of the collaborative decisions 112 step (line 770 of FIG. 7 is logically tied to line 850 of FIG. 8). As part of the coordination 114 step, the example workflow may involve interfacing with a service providing entity (as shown by block 800). The service providing entity is an entity with crews and/or equipment to perform the corrective actions. For example, the service providing entity may have a workover rig and crew to implement corrective actions needing a workover rig. The service providing entity may have crews and/or equipment to perform acidizing jobs. The service providing entity may have crews and/or equipment to perform fracturing or re-fracturing jobs. The service providing entity may have crews and/or equipment to perform perforation of the casing to expose previously bypassed zones. The service providing entity may have crews and/or equipment to install additional surface equipment, such as pump jacks, separators, and/or storage tanks. The service providing entity may have crews and/or equipment to install artificial lift equipment. In some cases, multiple independent service providing entities may be interfaced with. In other cases, the service providing entity may be legally related to the legal entity performing the workflow 100 (e.g., related company, division of the same company). Further still, the service providing entity may be related to the client that owns or controls the field of wells.

In accordance with the example workflow, based on the availability of the service providing entity as determined in the interfacing (again block 800), a modified recommendation (block 802) regarding corrective actions is created, the modified recommendation taking into account the service providing entity's availability of crews and equipment. For example, if the service providing entity has idle fracturing and acidizing crews and/or equipment, but the workover rigs of the service providing entity are currently deployed, the modified recommendation may thus advance wells in the proposed queue needing corrective actions in the form of acidizing and fracturing or re-fracturing, and move wells whose corrective actions require use of the workover rig until such time as a workover rig of the service providing entity becomes available.

Either or both of the final recommendation 710 or the modified recommendation 802 may present proposed corrective actions in any format suitable to the client and the particular situation. For example, the final recommendation and/or the modified recommendation may recommend corrective actions in several time frames, such as: rankings for correction actions to be performed in 1-3 months, 4-6 months, and 6 months and beyond. Moreover, there may sub-rankings. For example, wells with recommended actions in the 1-3 month time frame may be sub-ranked to indicate which well or wells in the 1-3 month category should be addressed first. Thereafter, one or more corrective actions are performed (block 804).

In some example situations, portions of the interfacing with the service providing entity may be carried out manually. For example, the interfacing may involve manually contacting (e.g., calling) a service providing entity to ascertain a future schedule. However, in other cases interfacing may be performed programmatically on a computer system or set of computer systems programmed to perform the interfacing, particularly when the service providing entity is legally related to the entity that performs the workflow 100.

FIG. 9 shows, in block diagram form, a series of computer systems that may be used to implement the programmatic aspects of the workflow. In particular, some or all the programmatic aspects of the example workflow 100 may be implemented by way of a workflow computer 900. The workflow computer may be a single computer, and system of networked computers, a server computer system, or the workflow computer 900 may be implemented on the "cloud" such that the precise location and number of processors dedicated to the workflow may change over time. The workflow computer 900 may be coupled to various other computer systems by way of a network 902. The network 902 may be a local area network, a wide area network, the Internet, or combinations thereof.

In the example system, the workflow computer 900 may couple to a various other computer systems such that information can be requested or derived. For example, the workflow computer 900 may couple to a computer system implementing a well log database 904. The well log database 904 may store electronic copies of previously run well logs, and thus as part of the data screening 102 step and/or the detailed studies 110 step workflow computer 900 may access well logs on the well log database 904. Further, the workflow computer 900 may also couple to a computer system implementing a database of production parameters (production parameter database 906). The production parameter database 906 may store production data associated with the wells of the field, such as historical information regarding oil production, gas production, water cut, BTU content of produced hydrocarbons, and other production-related values (e.g., downhole pressure, surface pressure, pressure at last shut in). Thus, the workflow computer 900 may access the production parameters database 906 as part of the data screening 102 step and/or the detailed studies 110 step.

Still referring to FIG. 9, the workflow computer 900 may further couple to the service providing entity computer system 908. The service providing entity computer 908 may store information such as scheduling information for the physical equipment and crews associated with performing corrective actions. Thus, the workflow computer 900 may access the service providing entity computer 908 as part of creating the modified recommendations 802.

Figure 10:
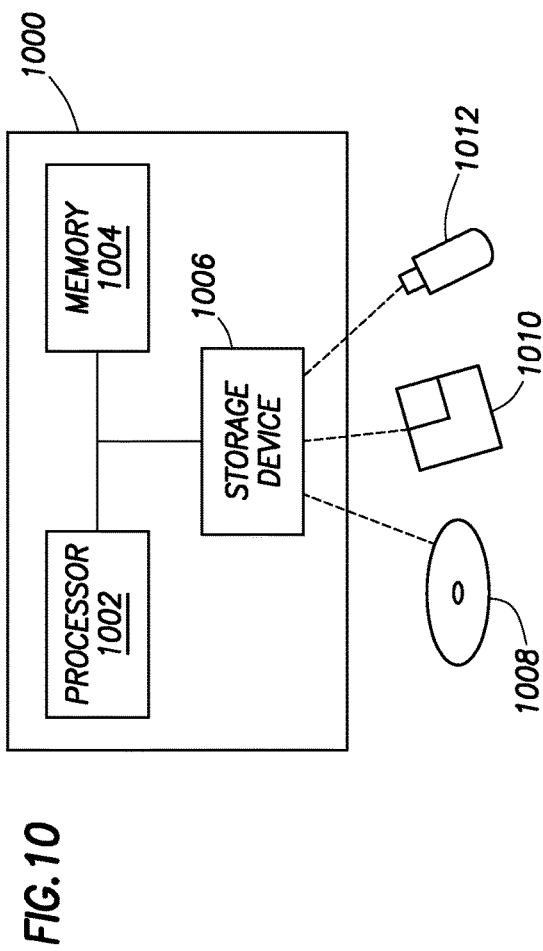
FIG. 10 shows a computer system in accordance with at least some embodiments.

FIG. 10 shows a computer system 1000 in accordance with at least some embodiments. The computer system 1000 is an example of a computer system that could be the workflow computer 900, the service providing entity computer 908, or the computer systems implementing the various databases 904 and 906. The example computer system 1000 comprises a processor 1002 coupled to the memory 1004 and a long term storage device 1006. The processor 1002 may be any currently available or after-developed processor, or group of processors. The memory 1004 may be random access memory (RAM) which forms the working memory for the processor 1002. In some cases, data and programs may be copied from the storage device 1006 to the memory 1004 as part of the operation of the system 1000.

The long term storage device 1006 is a device or devices that implement non-volatile long-term storage, which may also be referred to a computer-readable media. In some cases, the long term storage device is a hard drive, but other examples include optical discs 1008, "floppy" disks 1010, and flash memory devices 1012. The various programs used to implement the programmatic aspects of the workflow may thus be stored on the long term storage device 1006, and executed by the processor 1002.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment.

The above discussion is meant to be illustrative of the principles and various embodiments of the present invention. Numerous variations and modifications will become apparent to those skilled in the art once the above disclosure is fully appreciated. For example, corrective action regarding a well includes a plug and abandonment operations. Thus, corrective action shall not be read to require a task that increases hydrocarbon production. It is intended that the following claims be interpreted to embrace all such variations and modifications.

What is claimed is:

1. A computer-implemented method comprising:
    gathering, by a computer system from a database via a network, data about a group of wells within a hydrocarbon producing field;
    identifying conditions affecting hydrocarbon production for each well in the group of wells, based on the gathered data;
    determining at least one corrective action to be performed for each well in the group of wells, based on the conditions identified for that well;
    creating an initial prioritization of the group of wells based on the corrective action determined for each well of the group of wells;
    creating a secondary prioritization of the group of wells based on one or more predetermined criteria of a client and the initial prioritization of the group of wells;
    selecting at least one well from the group of wells for which the corresponding corrective action is to be performed, based on the secondary prioritization of the group of wells;
    determining an availability of a service providing entity to perform the corrective action for the selected well;
    providing, via the network to a computing device of the client, a recommendation regarding the corrective action to be performed for the selected well, based on the service providing entity's availability; and
    performing the corrective action on the selected well, based on the recommendation, wherein the corrective action is selected from the group consisting of: plugging the selected well for abandonment; fracturing at least one zone along the selected well; acidizing at least one production zone along the selected well; and perforating a casing to create a new production zone along the selected well.

2. The method of claim 1, wherein the data gathered from the database includes one or more of: well schematics; well histories;
    downhole pressures; surface pressures; production data; previously run well logs; natural gamma logs; gamma-gamma logs; neutron-gamma logs; and electrical resistivity logs.

3. The method of claim 1, wherein the identified conditions for each well in the group of wells include one or more of a first category of conditions related to mechanical aspects of the well, a second category of conditions related to production aspects of the well, and a third category of conditions related to petrophysics aspects associated with the well.

4. The method of claim 3, wherein at least one type of corrective action is determined for each category of conditions identified for each well in the group of wells, and the initial prioritization of the group of wells is created based on the type of corrective action determined for each category of conditions identified for each well.

5. The method of claim 4, wherein the type of corrective action for the first category of conditions involves a well repair, the type of corrective action for the second category of conditions involves an artificial lift, and the type of corrective action for the third category of conditions involves a well perforation at one or more bypassed zones.

6. The method of claim 1, wherein creating the secondary prioritization further comprises dividing the group of wells into categories of high priority wells, low priority wells, and wells to be plugged and abandoned, based on the initial prioritization and the one or more predetermined criteria of the client.

7. The method of claim 6, wherein dividing the group of wells into categories comprises:
analyzing at least some of the wells in the group, based on the initial prioritization and the one or more predetermined criteria of the client; and
categorizing each well in the group of wells based on the analysis, the analysis of each well including one or more of:
an analysis of a return on investment for capital expenditures to perform a corrective action;
an analysis of financial performance regarding operating expenditures in relation to expected future performance;
an analysis as to bypassed zones for new perforations;
an analysis as to production issues downhole;
an analysis as to production issues within the tubing;
an analysis as to production issues at the surface; and
an analysis as to reservoir issues affecting production.

8. The method of claim 1 wherein the service providing entity is owned by the client, and the availability of the service providing entity is determined by interfacing, via the network, with the computing device of the client regarding availability of the client's crews and equipment to perform the corrective action for the selected well.

9. The method of claim 1, wherein the service providing entity is owned by a third party, and the availability of the service providing entity is determined by interfacing, via the network, with a computing device of the third party regarding availability of the third party's crews and equipment to perform the corrective action for the selected well.

10. The method of claim 7, wherein the one or more predetermined criteria include a predetermined return-on-investment, and categorizing further comprises: categorizing wells in the group of wells for which the analysis indicates a return-on-investment below the predetermined return-on-investment as the wells to be plugged and abandoned.

11. The method of claim 6, wherein selecting comprises selecting the high priority wells and the low priority wells from the group of wells, and the recommendation provided to the computing device of the client indicates the corrective action to be performed for each of the selected high priority and low priority wells.

12. The method of claim 11, wherein providing comprises:
ranking corrective actions to be performed for the respective high priority and low priority wells selected from the group of wells, based on the availability of the service providing entity to perform each of the corrective actions; and
providing the recommendation regarding the corrective action to be performed for each of the selected high priority and low priority wells, based on the ranking.

13. The method of claim 1, wherein the corrective action includes at least one additional corrective action selected from the group consisting of:
resolving a downhole mechanical issue affecting hydrocarbon flow;
resolving a surface mechanical issue affecting hydrocarbon flow;
installing artificial lift equipment; and
installing surface tanks.

14. A system comprising:
a processor; and
a memory coupled to the processor,
wherein the memory stores a program that, when executed by the processor, causes the processor to perform a plurality of functions, including functions to:
gather, from a database via a network, data about each well in a group of wells within a hydrocarbon producing field;
identify conditions affecting hydrocarbon production for each well in the group of wells, based on the gathered data;
determine at least one corrective action to be performed for each well in the group of wells, based on the conditions identified for that well;
create an initial prioritization of the group of wells based on the corrective action determined for each well of the group of wells;
receive at least one predetermined criteria from a computing device of a client via the network;
create a secondary prioritization of the group of wells based on the at least one predetermined criteria and the initial prioritization;
communicate via the network with a computing device of a service providing entity to determine the service providing entity's availability to perform the corrective action for at least one well selected from the group of wells based on the secondary prioritization;
provide, to the client's computing device via the network, a recommendation regarding the corrective action to be performed for the selected well, based on the service providing entity's availability; and
perform the corrective action on the selected well, based on the recommendation wherein the corrective action is selected from the group consisting of: plugging the selected well for abandonment; fracturing at least one zone along the selected well;
acidizing at least one production zone along the selected well; and perforating a casing to create a new production zone along the selected well.

15. The system of claim 14, wherein the data gathered about each well from the database includes one or more of: a well production history; well downhole pressure trends; well surface pressure trends; well production data; and well log data.

16. The system of claim 14, wherein the identified conditions for each well in the group of wells include one or more of a first category of conditions related to mechanical aspects of the well, a second category of conditions related to production aspects of the well, and a third category of conditions related to petrophysics aspects associated with the well.

17. The system of claim 16, wherein at least one type of corrective action is determined for each category of conditions identified for each well in the group of wells, and the initial prioritization of the group of wells is created based on the type of corrective action determined for each category of conditions identified for each well.

18. The system of claim 17, wherein the type of corrective action for the first category of conditions involves a well repair, the type of corrective action for the second category of conditions involves an artificial lift, and the type of corrective action for the third category of conditions involves a well perforation at one or more bypassed zones.

19. The system of claim 14, wherein the functions performed by the processor to create the secondary prioritization include functions to divide the group of wells into categories of high priority wells, low priority wells, and wells to be plugged and abandoned, based on the initial prioritization and the one or more predetermined criteria of the client.

20. The system of claim 14, wherein the service providing entity is owned by the client, and the communication function performed by the processor includes communications via the network with the client's computing device regarding availability of the client's crews and equipment to perform the corrective action for the selected well.

21. The system of claim 14, wherein the service providing entity is owned by a third party, and the communication function performed by the processor includes communications via the network with a computing device of the third party regarding availability of the third party's crews and equipment to perform the corrective action for the selected well.

22. The system of claim 19, wherein the one or more predetermined criteria include a predetermined return-on-investment, and the functions performed by the processor further include functions to: analyze each well in the group based on the initial prioritization and the one or more predetermined criteria of the client; and categorize wells in the group of wells for which the analysis indicates a return-on-investment below the predetermined return-on-investment as the wells to be plugged and abandoned.

23. The system of claim 19, wherein the functions performed by the processor further include functions to: rank corrective actions to be performed for the respective high priority and low priority wells in the group of wells, based on the availability of the service providing entity to perform each of the corrective actions; and provide the recommendation regarding the corrective action to be performed for each of the high priority and low priority wells, based on the ranking.

24. The method of claim 12, wherein the corrective actions are ranked according to a time frame in which the service providing entity is determined to be available for performing each of the corrective actions corresponding to the high priority and low priority wells.

* * * * *